US012625902B1

(12) United States Patent
Gao et al.

(10) Patent No.: US 12,625,902 B1
(45) Date of Patent: May 12, 2026

(54) MULTIMODAL MACHINE LEARNING MODEL FOR CONTENT EVALUATION

(71) Applicant: Disney Enterprises, Inc., Burbank, CA (US)

(72) Inventors: Yupeng Gao, Redmond, WA (US); Pengfei Gao, Irvine, CA (US); Yan Zhang, Bellevue, WA (US); Zhe Wang, Foster City, CA (US); Yasir Hossain, Los Angeles, CA (US); Xingpeng Xiao, Irvine, CA (US); Mengzhe Li, Los Angeles, CA (US); Gianluca Milano, Farmingdale, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 19/036,723

(22) Filed: Jan. 24, 2025

(51) Int. Cl.
  *G06F 16/00* (2019.01)
  *G06F 16/2457* (2019.01)
  *G06F 16/435* (2019.01)

(52) U.S. Cl.
  CPC ...... *G06F 16/435* (2019.01); *G06F 16/24578* (2019.01)

(58) Field of Classification Search
  CPC .......................... G06F 16/435; G06F 16/24578
  See application file for complete search history.

(56) References Cited

U.S. PATENT DOCUMENTS

| | | |
|---|---|---|
| 9,420,319 B1 | 8/2016 | Story et al. |
| 11,445,259 B1 | 9/2022 | Stratton et al. |
| 12,143,677 B2 | 11/2024 | Stratton et al. |
| 2006/0200387 A1 | 9/2006 | Saini |
| 2009/0076902 A1 | 3/2009 | Grinsted et al. |
| 2013/0173765 A1 | 7/2013 | Korbecki |
| 2020/0356228 A1 | 11/2020 | Carney et al. |
| 2021/0019575 A1 | 1/2021 | Ouimet et al. |

(Continued)

OTHER PUBLICATIONS

U.S. Appl. No. 17/242,029, filed Sep. 13, 2022, Pull Notification From Separate Application (U.S. Pat. No. 11,445,259; Granted Sep. 13, 2022).

(Continued)

*Primary Examiner* — Paul Kim
(74) *Attorney, Agent, or Firm* — Patterson + Sheridan, LLP; Gero G. McClellan

(57) ABSTRACT

Embodiments provide for improved machine learning. A request for supplemental content to be provided in association with a media content item is received, and a set of candidate supplemental content items for the request is determined. A user embedding corresponding to a user embedding corresponding to a user associated with the media content item, a media embedding corresponding to the media content item, and a set of supplemental content embeddings corresponding to the set of candidate supplemental content items are accessed from one or more storage repositories. A set of interaction scores is generated based on processing the user embedding, the media embedding, and the set of supplemental content embeddings using an interaction machine learning model. A first supplemental content item of the set of candidate supplemental content items is selected for the request based on the set of interaction scores.

17 Claims, 8 Drawing Sheets

(56)     References Cited

U.S. PATENT DOCUMENTS

| | | |
|---|---|---|
| 2021/0295264 A1 | 9/2021 | Park et al. |
| 2022/0385976 A1 | 12/2022 | Stratton et al. |
| 2025/0272314 A1 * | 8/2025 | Melamed .............. G06F 16/313 |
| 2025/0285352 A1 * | 9/2025 | Xu ........................ G06F 16/438 |

OTHER PUBLICATIONS

U.S. Appl. No. 17/818,950, filed Nov. 12, 2024, Pull Notification for Applications (U.S. Pat. No. 12,143,677; Granted Nov. 12, 2024).

U.S. Appl. No. 18/910,863, filed Oct. 9, 2024, Pull Notifications for Applications.

U.S. Appl. No. 19/035,731, filed Jan. 23, 2025, Data-Driven Content Interaction.

"Interactive Living Room", https://advertising.hulu.com/ad-products/interactive-living-room/, 1 page, Apr. 27, 2021.

Jon Lafayette , "Hulu Brings E-Commerce to Living Room TV Screens", https://www.nexttv.com/news/hulu-brings-e-commerce-living-room-tv-screens-165482, 7 pages, dated May 3, 2017.

* cited by examiner

500

600

```
┌──────────────────┐
│   Access user    │─── 605
│   feature(s)     │
└──────────────────┘
          │
          ▼
┌──────────────────┐
│  Generate user   │─── 610
│ embedding using  │
│  user embedding  │
│ machine learning │
│      model       │
└──────────────────┘
          │
          ▼
┌──────────────────┐
│     Access       │─── 615
│  supplemental    │
│ content feature(s)│
└──────────────────┘
          │
          ▼
┌──────────────────┐
│    Generate      │─── 620
│   secondary      │
│ embedding using  │
│   secondary      │
│   embedding      │
│ machine learning │
│      model       │
└──────────────────┘
```

```
┌──────────────────┐
│  Access primary  │─── 625
│ content feature(s)│
└──────────────────┘
          │
          ▼
┌──────────────────┐
│  Generate image  │─── 630
│ embedding using  │
│   first media    │
│   embedding      │
│ machine learning │
│      model       │
└──────────────────┘
          │
          ▼
┌──────────────────┐
│  Generate audio  │─── 635
│ embedding using  │
│  second media    │
│   embedding      │
│ machine learning │
│      model       │
└──────────────────┘
          │
          ▼
┌──────────────────┐
│ Aggregate media  │─── 640
│   embeddings     │
└──────────────────┘
```

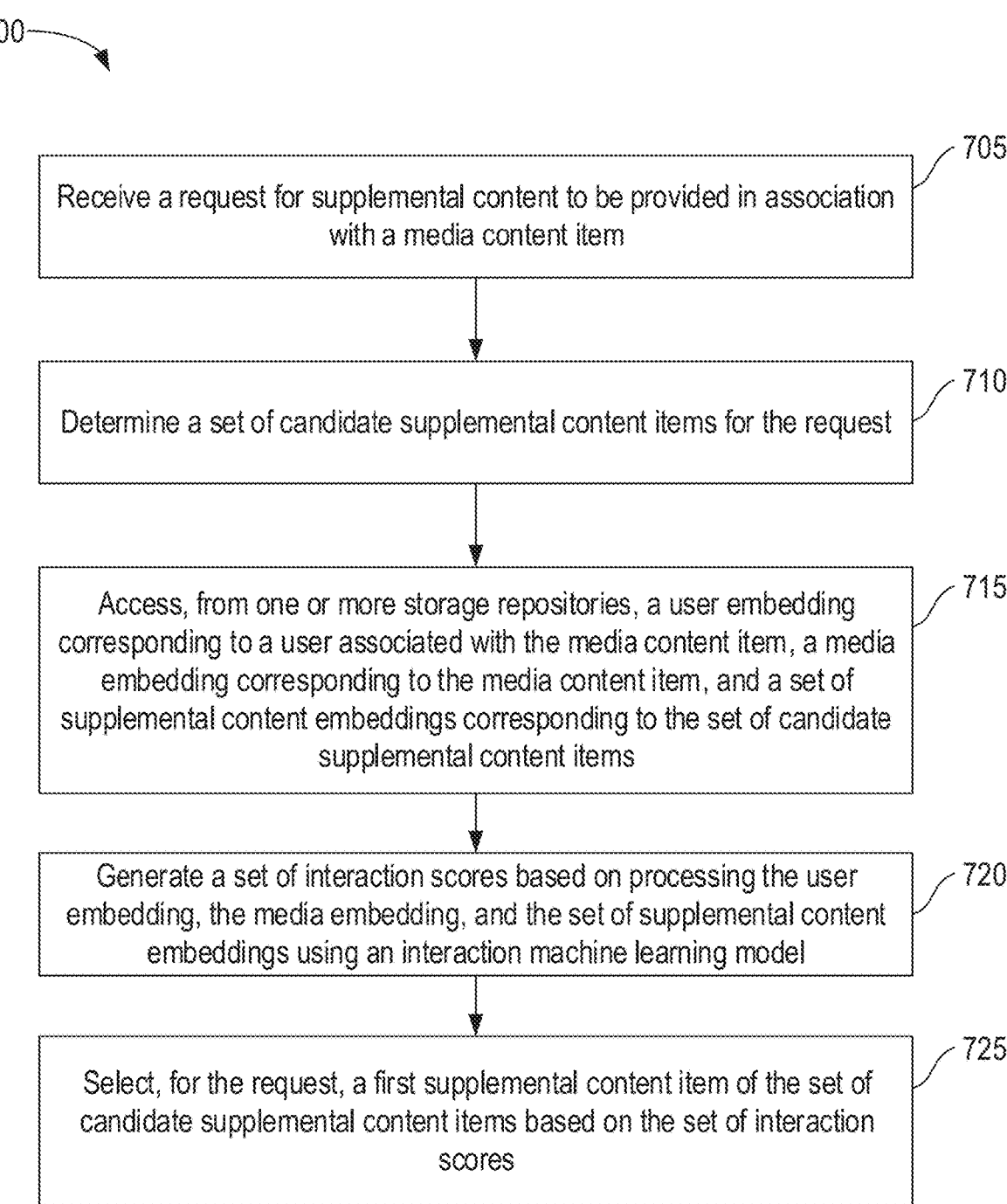

705

Receive a request for supplemental content to be provided in association with a media content item

710

Determine a set of candidate supplemental content items for the request

715

Access, from one or more storage repositories, a user embedding corresponding to a user associated with the media content item, a media embedding corresponding to the media content item, and a set of supplemental content embeddings corresponding to the set of candidate supplemental content items

720

Generate a set of interaction scores based on processing the user embedding, the media embedding, and the set of supplemental content embeddings using an interaction machine learning model

725

Select, for the request, a first supplemental content item of the set of candidate supplemental content items based on the set of interaction scores

*FIG. 7*

MULTIMODAL MACHINE LEARNING MODEL FOR CONTENT EVALUATION

BACKGROUND

The digital content landscape is continuously evolving. Not only is there a tremendous variety of primary content (e.g., multimedia such as a video stream, audio stream, and the like) available to users, but there is also a similarly vast assortment of supplemental content (e.g., promotional content, recommendations, live events, and the like) which can be provided along with the primary content. Though significant resources have been expended seeking to improve supplemental content selection, there remains substantial opportunity for improvement. Recently, some attempts have been made to use machine learning to improve content selection. However, such approaches have thus far been suboptimal in their selections. Further, such approaches generally incur substantial computational expense (e.g., relying on substantial compute resources such as memory). Further, such approaches generally introduce significant latency (e.g., significant time is consumed processing the various data to select content), rendering these approaches unsuitable for many digital content environments where these delays are unacceptable.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

FIG. 6 is a flow diagram depicting an example method for feature generation for multimodal machine learning, according to some embodiments of the present disclosure.

FIG. 7 is a flow diagram depicting an example method for machine learning, according to some embodiments of the present disclosure.

DETAILED DESCRIPTION

Many modern content providers face challenging problems relating to providing digital content, including supplemental content (e.g., in-stream promotions, live events, advertisements, recommendations on social media feeds, interactive advertisements or other media, and the like). In some embodiments, digital content (e.g., streaming video, audio, games, and any other suitable content) may be often supported by (or include slots for insertion of) various supplemental content items. Online supplemental content serving demands low latency (e.g., to prevent delay in the providing of the digital content) as well as high prediction accuracy (e.g., to ensure the supplemental content is relevant or not disruptive). However, many modern approaches neglect a wide variety of contextual features which can hold valuable information for enhancing personalized user experiences.

In some embodiments of the present disclosure, a multimodal model architecture for online supplemental content evaluation is provided, designed to deliver swift and highly accurate predictions while harnessing the power of contextual features. Further, in some embodiments, portions of the mode may be executed in an offline fashion (e.g., prior to beginning serving of any content to a user). In some embodiments, a relatively small portion of the model can be executed online during runtime (e.g., while users consume content) while leveraging the information gleaned during offline execution. This hybrid offline-online architecture can enable the model to generate online predictions with significantly reduced computational expense (e.g., relying on less memory and compute, as well as consuming less energy and generating less heat) as well as reduced latency (e.g., more rapid predictions). Further, in some aspects, this architecture can reduce bandwidth usage by reducing the amount of data that is loaded and/or used during the online phase.

In some embodiments, selection of appropriate supplemental content is performed based on evaluation of multiple modalities of information in order to improve the selection process. For example, while some approaches seek to identify the most relevant supplemental content for a particular user to whom the content is being delivered, these approaches do not understand the primary content itself which is being consumed. As a result, the selected supplemental content is often a jarring interruption to the user, and user engagement suffers as a direct result. In some embodiments of the present disclosure, an artificial intelligence (AI) system is used to understand the correlations among supplemental content, primary content, and users in order to improve the content serving process and increase the probability that the user will engage with and/or utilize the content.

Figure 1:
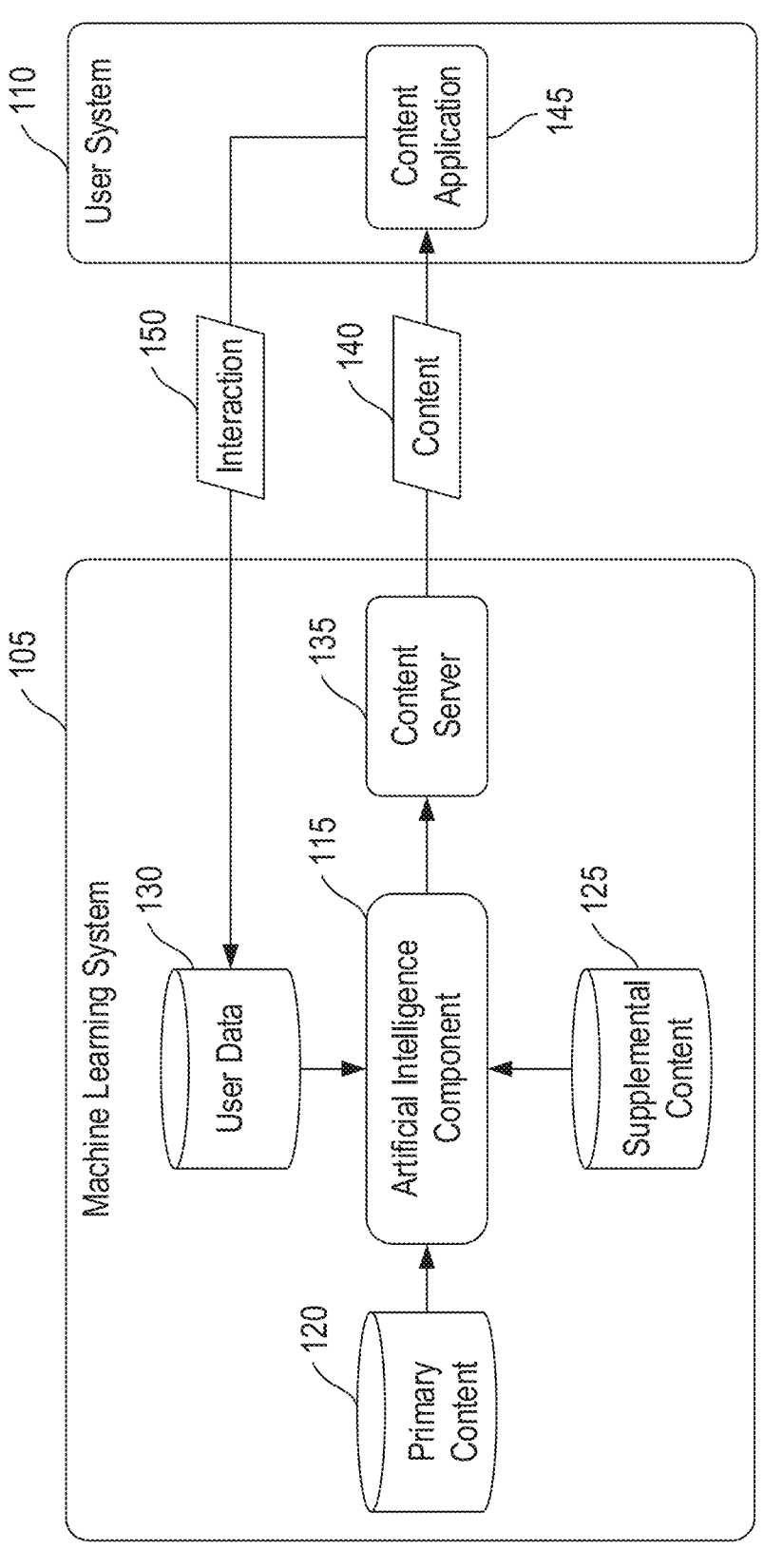
FIG. 1 depicts an example system for multimodal machine learning, according to some embodiments of the present disclosure.

FIG. 1 depicts an example system 100 for multimodal machine learning, according to some embodiments of the present disclosure.

In the illustrated example, the system 100 includes a machine learning system 105 and a user system 110. Although depicted as two discrete computing systems for conceptual clarity, in embodiments, the operations of each computing system may be combined or distributed across any number of systems. For example, although the illustrated example depicts a content server 135 as a component of the machine learning system 105, in some aspects, this content server 135 may be a discrete or standalone computing system.

In the illustrated example, the user system 110 comprises a content application 145. The content application 145 is generally representative of any component that enables or facilitates delivery of media content (e.g., videos, audio, imagery, and the like) from one or more remote repositories (e.g., the content server 135) to the user system 110 (e.g., for display or output to the user). For example, the content application 145 may be a streaming application that facilitates streaming of multimedia content, a social media application that provides streams or feeds of content to users, and the like. Specifically, in the illustrated example, the content application 145 receives content 140 from a content server 135, and outputs the items of content 140 to the user. Generally, the content application 145 may receive the content 140 using any suitable techniques, including over one or more networks or communication links (e.g., wired, wireless, or a combination of wired and wireless links). For example, in some embodiments, the content application 145 receives the content 140 over the Internet.

In the illustrated example, the content application 145 can further provide information related to interactions 150 to the machine learning system 105. The interactions 150 generally indicate any interactions or actions of the user with respect to the delivered content 140. For example, the interactions 150 may indicate whether the user enjoyed the content 140, whether the user clicked on or otherwise engaged with the content 140, and the like. In some embodiments, the interactions 150 may include information related to whether the user scanned all or a portion of the content 140 (e.g., scanning a quick-response (QR) code or barcode, included in the content 140, using the user system 110 or a device such as a smartphone), whether the user requested a notification relating to the content 140 (e.g., requested a push notification so they can review the content in more detail), whether the user requested an email or other message be sent to them relating to the content 140, whether the user clicked on or selected the content 140, whether the user exited or closed the content 140, and the like.

Further, although not depicted in the illustrated example, in some aspects, the content application 145 may interact directly with the content server 135, such as to allow the user to select which content they would like to receive. Generally, the content 140 may include primary content items (e.g., the primary media which the user wishes to consume, such as a show, movie, podcast, and the like) and/or supplemental content items (e.g., secondary content which may be provided to support the primary content, to provide opportunities for deeper interaction, and the like). For example, while the user may select which primary content item(s) they wish to consume, the machine learning system 105 may select corresponding supplemental content items without direct input from the user.

In the illustrated example, the machine learning system 105 includes an AI component 115, a content server 135, and several data repositories including libraries of primary content 120, supplemental content 125, and user data 130. Although depicted as components of the machine learning system 105, in some aspects, some or all of the depicted components may be components of other systems and/or may be standalone components. For example, the primary content 120, supplemental content 125, and user data 130 are generally representative of any source for the corresponding information, including local repositories, remote repositories, and the like.

As illustrated, the AI component 115 accesses data from the primary content 120, supplemental content 125, and user data 130 to evaluate candidate supplemental content items (e.g., from the library of supplemental content 125). Based on this evaluation, the AI component 115 can select supplemental content items(s) to be delivered to the user. Specifically, in the illustrated example, the AI component 115 may evaluate the primary content 120 currently being consumed by the user (also referred to in some aspects as the "primary content item" and/or as the "media content item"), user data 130 associated with the user consuming the content (e.g., demographics, historical interactions, and the like, as discussed in more detail below) and a set of alternative or candidate supplemental content items (from the library of supplemental content 125) to select supplemental content item (s) to be served to the user.

Generally, the particular contents of the user data 130 may vary depending on the particular implementation. For example, in various embodiments, the user data 130 may include (without limitation), data such as demographic information, user interaction history (e.g., a record of the user's engagement with primary and/or supplemental content, such as previous clicks, likes, comments, shares, and/or time spent on specific content types), behavioral data (e.g., patterns such as typical viewing times, devices used, preferred genres, and/or inferred user preferences based on repetitive behaviors, such as if a user frequently skips supplemental during certain types of content but engages with supplemental content during others), previous supplemental content interactions (e.g., data regarding the supplemental content a user has interacted with, such as click-through rates, purchases or other actions made after viewing supplemental content, time spent watching specific supplemental content, and the like), and/or explicit preferences (e.g., preferences provided by the user, such as content types, brands, or genres indicated in their profile or settings).

In some embodiments, the details provided in the user data 130 can support contextual personalization, where the multimodal model can adjust supplemental content selection dynamically based on real-time user interactions with primary content. For example, if the machine learning system recognizes that a user frequently skips supplemental content during short-form videos but engages with supplemental content while consuming long-form primary content, the artificial intelligence component 115 may adapt by delivering different types of supplemental content depending on the primary content session. This approach ensures that the system not only accounts for general user preferences, but also adjusts based on contextual factors such as the time of day, platform, or content type.

Advantageously, by evaluating the user data 130, primary content 120, and alternative supplemental content 125, the AI component 115 can provide an improved selection from among the supplemental content item alternatives. For example, by evaluating the user data 130 and the candidate supplemental content 125, the AI component 115 may select supplemental content 125 that is likely to be useful, relevant, engaging, or otherwise beneficial for the particular user. Further, by evaluating the primary content 120 being consumed as well, the AI component 115 can select supplemental content while ensuring or improving cohesion (e.g., reducing a perceived gap between the primary content and the supplemental content) and relevance. For example, if the primary content 120 has a dark and gloomy atmosphere (e.g., a psychological thriller), supplemental content 125 with a bright and cheery atmosphere (e.g., an advertisement for a traveling circus) may be jarring and disruptive.

In some embodiments, as discussed in more detail below, the AI component 115 may use a variety of machine learning models to evaluate the various modalities of input data and score supplemental content items. For example, the AI component 115 may use one model (e.g., a media embedding machine learning model) to extract features and/or generate embeddings for the primary content items (from the library of primary content 120), a second model (e.g., a supplemental or secondary content embedding machine learning model) to extract features and/or generate embeddings for the supplemental content items (from the library of supplemental content 125), and a third model (e.g., a user embedding machine learning model) to extract features and/or generate embeddings for user characteristics (e.g., from the user data 130). In some embodiments, the AI component 115 may then process these embeddings using another model (e.g., an interaction machine learning model) to score each supplemental content item based on the predicted interaction(s) the user will have with the item.

In some aspects, as discussed in more detail below, the various models used by the AI component 115 may be jointly trained (e.g., during an offline model training phase). In some embodiments, some of the models (e.g., embedding models) may then be used to generate the relevant embeddings in an offline manner (e.g., before the user begins consumes content). Subsequently, when the user consumes a primary content item (e.g., when the user requests or begins the primary content, or while the user is already consuming the content), the AI component 115 may use one or more of the models (e.g., the interaction model) in an online manner (e.g., to process the pre-generated embeddings in order to make an online or real-time selection).

Such a division between offline pre-generation of (at least some of) the input data and online evaluation of candidate supplemental content items can substantially reduce the latency and computational expense of the online predictions, as compared to an all-online approach. That is, a substantial portion of the computing resources and time used to evaluate the supplemental content can be used offline (when no user is awaiting a selection). In some embodiments, this allows the actions to be performed during off-peak hours (e.g., overnight). For example, the AI component 115 (or another component) may generate the embeddings when computational resource usage (e.g., memory consumption, processor utilization, network bandwidth, and the like) is already low, when the expense is low (e.g., when energy prices are lower due to lower usage, meaning the embeddings can be generated with less cost), when heat generation is less burdensome (e.g., because no other applications are currently running, meaning the embeddings can be generated with less wear on the computing system), and the like.

As another example, in some embodiments, the AI component 115 may perform the evaluation using fewer computational resources, as compared to a purely online approach. For example, because some of the embeddings can be generated offline, there may be less urgency to complete the processing quickly. Therefore, the AI component 115 (or another system) may allocate less resources to the processes, allowing the generation to be performed more slowly but on substantially reduced resources. As another example, the AI component 115 may use model architectures that are more computationally efficient (e.g., fewer resources, such as less memory, less energy, and the like) even if these models are also slower to generate output.

Further, by leveraging the rich offline-generated embeddings during the online content evaluation process, the AI component 115 can ensure that the selections are highly accurate and reliable, as compared to solutions that require all data to be processed online (e.g., because such implementations often consider substantially less information in order to expedite the decision making, thereby making suboptimal choices).

As illustrated, once the AI component 115 selects a supplemental content item, the AI component 115 instructs the content server 135 to deliver the selected supplemental content item to the user (e.g., as content 140 via the content application 145). In the illustrated example, the interaction(s) 150 of the user with respect to the selected content 140 can then be monitored (e.g., to generate updated user data 130). In this way, the AI component 115 can learn how to best score supplemental content items (e.g., based on how the user or multiple users interact with the previous selections).

This continuous learning can substantially improve model performance.

Figure 2:
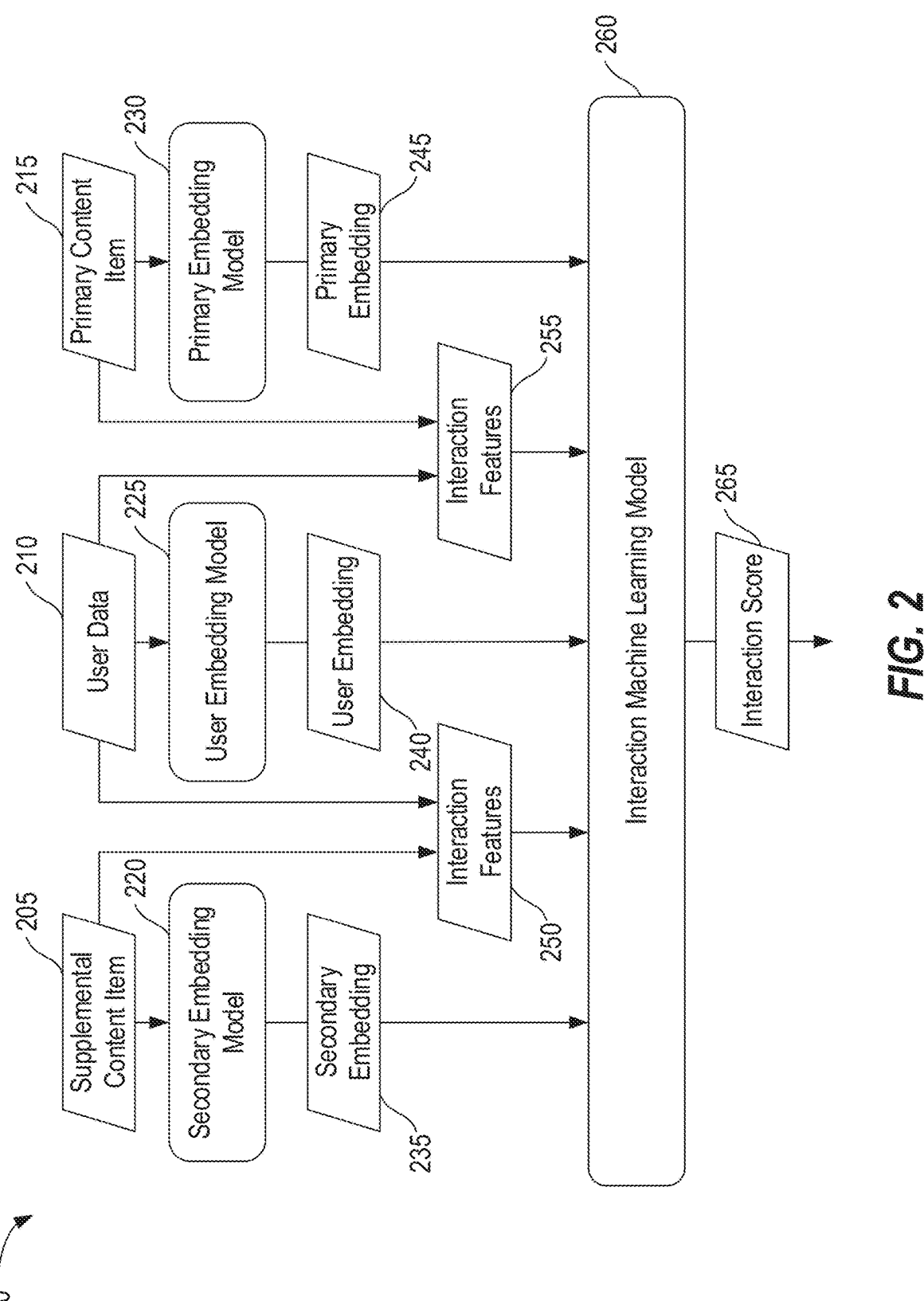
FIG. 2 depicts an example model architecture for multimodal machine learning, according to some embodiments of the present disclosure.

FIG. 2 depicts an example model architecture 200 for multimodal machine learning, according to some embodiments of the present disclosure. In some embodiments, the architecture 200 provides additional detail for the machine learning model(s) used by an AI component, such as the AI component 115 of FIG. 1, to evaluate supplemental content items. That is, the architecture 200 may be used by a machine learning system, such as the machine learning system 105 of FIG. 1.

As illustrated, the architecture 200 comprises a set of machine learning models including a secondary embedding model 220, a user embedding model 225, and a primary embedding model 230, as well as an interaction machine learning model 260. In the illustrated example, the three embedding models act as three towers or modalities of input for the interaction machine learning model 260, which unifies the modalities and generates comprehensive interaction scores 265. Generally, the particular architecture used by each embedding model may vary depending on the particular implementation and modality to which the model corresponds. For example, in some embodiments, each embedding model may use a multilayer perceptron (MLP) architecture to generate corresponding embeddings.

In the illustrated example, the secondary embedding model 220 can process a given supplemental content item 205 (e.g., from the library of supplemental content 125 of FIG. 1) to generate a secondary embedding 235 (also referred to as a "secondary content embedding" and/or a "supplemental content embedding" in some aspects) for the supplemental content item 205. As discussed above, a supplemental content item 205 is generally a piece of media content (e.g., a video, an image, audio, and the like) that is used to supplement primary content. In some embodiments, while users may directly select primary content, the supplemental content may be provided without any such explicit selection by the user. For example, the supplemental content item 205 may include an advertisement, a live update (e.g., for breaking news or an updated score in a sports competition), an indication of additional content the user may like, fun facts or interactive quizzes or riddles, and the like.

In some aspects, the secondary embedding model 220 may evaluate the supplemental content item 205 itself. That is, the secondary embedding model 220 may be used to process the image(s), text, video, and/or audio included in the supplemental content item 205 in order to generate the secondary embedding 235. In some aspects, the secondary embedding model 220 may process other information or data describing the supplemental content item 205 without evaluating the item itself. For example, in some aspects, the secondary embedding model 220 may evaluate metadata associated with the supplemental content item 205, where the metadata indicates features or characteristics of the supplemental content item 205 such as the industry or product it relates to, the mood or atmosphere of the supplemental content item 205, the length of the supplemental content item 205, the visual brightness and/or audio volume of the supplemental content item 205, and the like. In some aspects, the metadata can similarly indicate details about the content, such as a text representation of any audio in the supplemental content item 205 (e.g., a text transcript of spoken speech).

As illustrated, the secondary embedding model 220 may evaluate these features and/or characteristics of the supplemental content item 205 to generate the secondary embedding 235 for the given supplemental content item 205. For example, the secondary embedding model 220 may be implemented as a neural network (e.g., an MLP) that is trained to generate embeddings based on input supplemental content item features. Generally, the secondary embedding 235 is a numerical representation of the relevant features of the supplemental content item 205. For example, the secondary embedding 235 may be a vector (e.g., a set of numerical values) describing the content in an embedding space. As illustrated, the secondary embedding 235 may be provided as input to the interaction machine learning model 260, discussed in more detail below.

In the illustrated example, the user embedding model 225 can process user data 210 (e.g., from the user data 130 of FIG. 1) corresponding to a given user in order to generate a user embedding 240. As discussed above, a user data 210 may generally represent information or characteristics about or describing a given user, such as the demographics of the user. For example, the user data 210 may indicate the user's age, location or residency, and the like. In some embodiments, the user data 210 may include information about previous interactions and/or media consumption of the user. For example, the user data 210 may indicate how the user previously interacted with various supplemental content items, what primary content the user likes to consume, and the like.

As illustrated, the user embedding model 225 may evaluate these features and/or characteristics of the user data 210 to generate the user embedding 240. For example, the user embedding model 225 may be implemented as a neural network (e.g., an MLP) that is trained to generate embeddings based on input user features. Generally, the user embedding 240 is a numerical representation of the relevant features of the user data 210. For example, the user embedding 240 may be a vector (e.g., a set of numerical values) describing the user in an embedding space. As illustrated, the user embedding 240 may be provided as input to the interaction machine learning model 260, discussed in more detail below.

In the illustrated example, the primary embedding model 230 can process a given primary content item 215 (e.g., from the library of primary content 120 of FIG. 1) to generate a primary embedding 245 (also referred to as a "media embedding" and/or a "primary content embedding" in some aspects) for the primary content item 215. As discussed above, a primary content item 215 is generally a piece of media content (e.g., a video, an image, audio, and the like) that is selected by a user for consumption.

In some aspects, the primary embedding model 230 may process information or data describing the primary content item 215 without evaluating the item itself. For example, in some aspects, the primary embedding model 230 may evaluate metadata associated with the primary content item 215, where the metadata indicates features or characteristics of the primary content item 215 such as the industry it relates to, the mood or atmosphere of the primary content item 215, the length of the primary content item 215, the visual brightness and/or audio volume of the primary content item 215, and the like.

In some aspects, the primary embedding model 230 may additionally or alternatively evaluate the primary content item 215 itself. That is, the primary embedding model 230 may be used to process the image(s), text, video, and/or audio included in the primary content item 215 in order to generate the primary embedding 245. For example, in some embodiments, to generate a more meaningful representation of the primary content item 215, the primary embedding model 230 may comprise a set of models, such as a first media embedding model to evaluate one modality or aspect of the primary content item 215 (e.g., the images or video of the content), a second media embedding model to evaluate another modality or aspect of the primary content item 215 (e.g., the audio of the content), and/or a third media embedding model to evaluate yet another modality or aspect of the primary content item 215 (e.g., the text and/or spoken words of the content, metadata associated with the content, and the like).

For example, in some embodiments, the machine learning system may process image data (e.g., one or more images or frames from the primary content item 215) using a convolutional neural network (CNN) to generate a set of image features (also referred to as visual features in some aspects) for the primary content item 215. That is, one or more frames from the primary content item 215 may be processed using a CNN or other model architecture to generate visual features of the content. Further, in some embodiments, the machine learning system may process audio data (e.g., a waveform representing one or more seconds of audio) using a model (e.g., a CNN) to generate a set of audio features for the primary content item 215. That is, one or more sections of audio may be processed using a CNN or other architecture to generate audio features for the content.

Additionally, in some embodiments, the machine learning system may process text data (e.g., indicating text displayed during the content, and/or a transcript of spoken speech from the content) using a model (e.g., a CNN) to generate a set of text features for the primary content item 215. That is, one or more strings of text may be processed using a CNN or other architecture to generate text features for the content. Similarly, in some aspects, other aspects such as metadata (e.g., tags) associated with the content can be evaluated using one or more machine learning models to generate corresponding metadata features.

In some aspects, the primary embedding model 230 evaluate features from a window of time for the primary content item 215. That is, while a primary content item 215 may be fairly long (e.g., several minutes or hours), the primary embedding model 230 may evaluate a subset of the primary content to generate the primary embedding(s) 245. For example, the primary content item 215 may be delineated into relatively shorter windows of content (e.g., thirty second clips, one minute long clips, and the like) and the machine learning system may generate a respective primary embedding 245 for each such delineation. In some embodiments, when evaluating supplemental content items, the machine learning system may use the primary embedding(s) 245 for the section of the content that immediately precedes the service of the supplemental content. For example, suppose that the primary content item 215 is delineated into windows or portions A, B, C, and D. In some embodiments, when serving supplemental content (e.g., after portion C but before portion D), the machine learning system may evaluate the corresponding embeddings from one or more portions prior to the content interruption (e.g., the primary embeddings 245 for the portions B and/or C). In some embodiments, the machine learning system may further evaluate the corresponding embeddings from one or more subsequent portions (not yet consumed), such as the embedding corresponding to the portion D. This can ensure that the selected supplemental content item fits well with the primary content, both before and after the insertion slot. Further, in some embodiments, using such truncated portions to generate the primary embeddings 245 can further reduce the training expense and time (as compared to evaluating the entire piece of media content).

As illustrated, the primary embedding model 230 may evaluate these features and/or characteristics of the primary content item 215 to generate the primary embedding 245 for the given primary content item 215. For example, the primary embedding model 230 may be implemented as one or more neural networks (e.g., CNNs, MLPs, and the like) that are trained to generate embeddings based on input primary content item features. In some embodiments, the primary embedding model 230 may aggregate or combine these individual features (e.g., audio features generated by one model based on the audio, visual features generated based on the images using another model, and so on) to generate an overall primary embedding 245 for the primary content item 215. For example, in some embodiments, the primary embedding model 230 may aggregate the features by concatenating them together. In some aspects, these concatenated features may be used as the primary embedding 245. In some embodiments, the primary embedding model 230 may process the aggregated (e.g., concatenated) features using another media machine learning model (e.g., a fusion or aggregation model) to generate the primary embedding 245 based on processing the aggregated features (e.g., the text, audio, and/or image features).

Generally, the primary embedding 245 is a numerical representation of the relevant features of the primary content item 215 (with respect to the given window). For example, the primary embedding 245 may be a vector (e.g., a set of numerical values) describing the section of the content in an embedding space. As illustrated, the primary embedding 245 may be provided as input to the interaction machine learning model 260, discussed in more detail below.

In the illustrated example, in addition to the secondary embedding 235, user embedding 240, and primary embedding(s) 245, the machine learning system may further generate two sets of interaction features 250 and 255. Generally, the interaction features 250 and 255 may represent overlap or interactions between aspects of the model modalities. In the illustrated architecture, the interaction features 250 represent or indicate interactions between the supplemental content item 205 and the user data 210. For example, in some embodiments, the interaction features 250 may indicate how many times the specific user has clicked on the specific supplemental content item 205, requested a push notification based on the content, requested an email to themselves with more information, whether the user has received the supplemental content item before (ever and/or within a defined period of time), and the like.

Further, in the illustrated example, the interaction features 255 represent or indicate interactions between the primary content item 215 and the user data 210. For example, in some embodiments, the interaction features 255 may indicate how many times the specific user has viewed or consumed the specific primary content item 215, how long it has been since the first time the user consumed the media, how much time has passed since the most recent time the user consumed the primary content, and the like.

Although not depicted in the illustrated example in some aspects, the machine learning system may further generate another set to interaction features 255 based on interactions between the supplemental content item 205 and the primary content item 215. For example, in some embodiments, the interaction features 255 may indicate how many times the specific supplemental content item 205 was delivered alongside (or in an insertion slot of) the primary content item 215, which particular time the supplemental content item 205 has been delivered with the primary content time 215 (e.g., which insertion slot of a sequence of slots spread throughout the media content), and the like. In the illustrated example, the interaction features 250 and 255 are also provided as input to the interaction machine learning model 260.

As illustrated, the interaction machine learning model 260 evaluates the input modalities (e.g., the secondary embedding 235, the interaction features 250, the user embedding 240, the interaction features 255, and the primary embedding 245) and generates a set of one or more interaction score(s) 265. Generally, the particular architecture of the interaction machine learning model 260 may vary depending on the particular implementation. In some aspects, the interaction machine learning model 260 is a shared MLP (e.g., neural network) trained for multi-class prediction. For example, in some embodiments, the interaction machine learning model 260 may generate, for each respective action (or interaction) of a set of possible actions (e.g., a set of actions that are of interest), a respective probability that the user will engage in or perform the action (or interaction) in response to the delivery of the particular supplemental content item 205 (while the user is consuming the primary content item 215).

For example, suppose the set of actions include scanning a code included with the supplemental content item 205 (e.g., a QR code), requesting a push notification for the supplemental content item 205 (e.g., requesting that the content server 135 of FIG. 1 or another system send a push notification to the user's device, allowing the user to view more details now or later on the same device or on a different device from the device being used to consume the media), requesting an email or other message be sent to the user (or to another user) regarding the supplemental content item 205 (e.g., allowing the user to review the details later), clicking on the supplemental content item 205 (e.g., to pause the content and immediately view more detail on the supplemental content item 205), closing or exiting the supplemental content item 205 (e.g., pressing a "close" or "skip" button), ignoring the supplemental content item 205 (e.g., taking no action until after the supplemental content item 205 is automatically ended), and the like. In some aspects, the interaction machine learning model 260 may generate, for each such action, a respective score (e.g., between zero and one) indicating a probability that the user will take the respective action.

In some embodiments, in addition to or instead of generating a set of scores, the interaction machine learning model 260 may generate an aggregated interaction score 265 for the supplemental content item 205 (with respect to the user and primary content). For example, in some aspects, the interaction machine learning model 260 may generate a weighted sum of the probabilities of each interaction (where positive interactions may have a positive weight indicating a desirable outcome, and negative interactions may have a negative weight indicating an undesirable outcome).

For example, in some embodiments, the interaction score 265 may be defined as $score = W_{scan}*P(scan) + W_{push}*P(push) + W_{message}*P(message) + W_{click}*P(click) - W_{xout}*P(xout)$, where score is the interaction score 265 for the supplemental content item 205, $W_{scan}$, $W_{push}$, $W_{message}$, $W_{click}$, and $W_{xout}$ are the weights given to a scan action, a push notification request, a message request, a click action, and a close or exit action, respectively, and P(scan), P(push), P(message), P(click), and P(xout) are the probability (as predicted by the interaction machine learning model 260) of the user performing a scan action, a push notification request, a message request, a click action, and a close or exit action, respectively.

In some embodiments, the weights used for each action may be a hyperparameter (e.g., defined by an administrator or data scientist). In some embodiments, in addition to being used to generate the interaction score 265, this equation may also be used to generate the training objective during training of the model. For example, the machine learning system may collect feedback as discussed above (e.g., the interaction 150 of FIG. 1 indicating how the user reacted to the content) and may use this actual or "ground-truth" interaction to generate a loss (e.g., based on the difference between the actual action and the predicted probability of each action). This loss can then be used to train the models (e.g., updating one or more parameters via backpropagation).

In some embodiments, during a training phase, the machine learning system may jointly train the depicted models in an end-to-end fashion. That is, the machine learning system may generate a loss based on the final interaction score 265 (and the actual action taken by the user), and may backpropagate this loss through each model (e.g., through the interaction machine learning model 260 and into the primary embedding model(s) 230, user embedding model 225, and secondary embedding model 220). This allows each model to be jointly trained. Although not depicted in the illustrated example, in some aspects, a similar approach may be used to further refine or train the model(s) based on runtime feedback (e.g., based on actions taken by users and the interaction scores generated during online use), either continuously (e.g., during runtime) or periodically (e.g., using periodic training or refinement phases).

In some embodiments, as discussed below in more detail, a subset of the depicted models (e.g., the secondary embedding model 220, the user embedding model 225, and/or the primary embedding model 230) may be used offline after the training is complete to generate a corpus or library of embeddings. During online prediction (e.g., when a user is consuming media), the interaction machine learning model 260 may access and evaluate these pre-generated embeddings to rapidly generate interaction scores 265.

Figure 3:
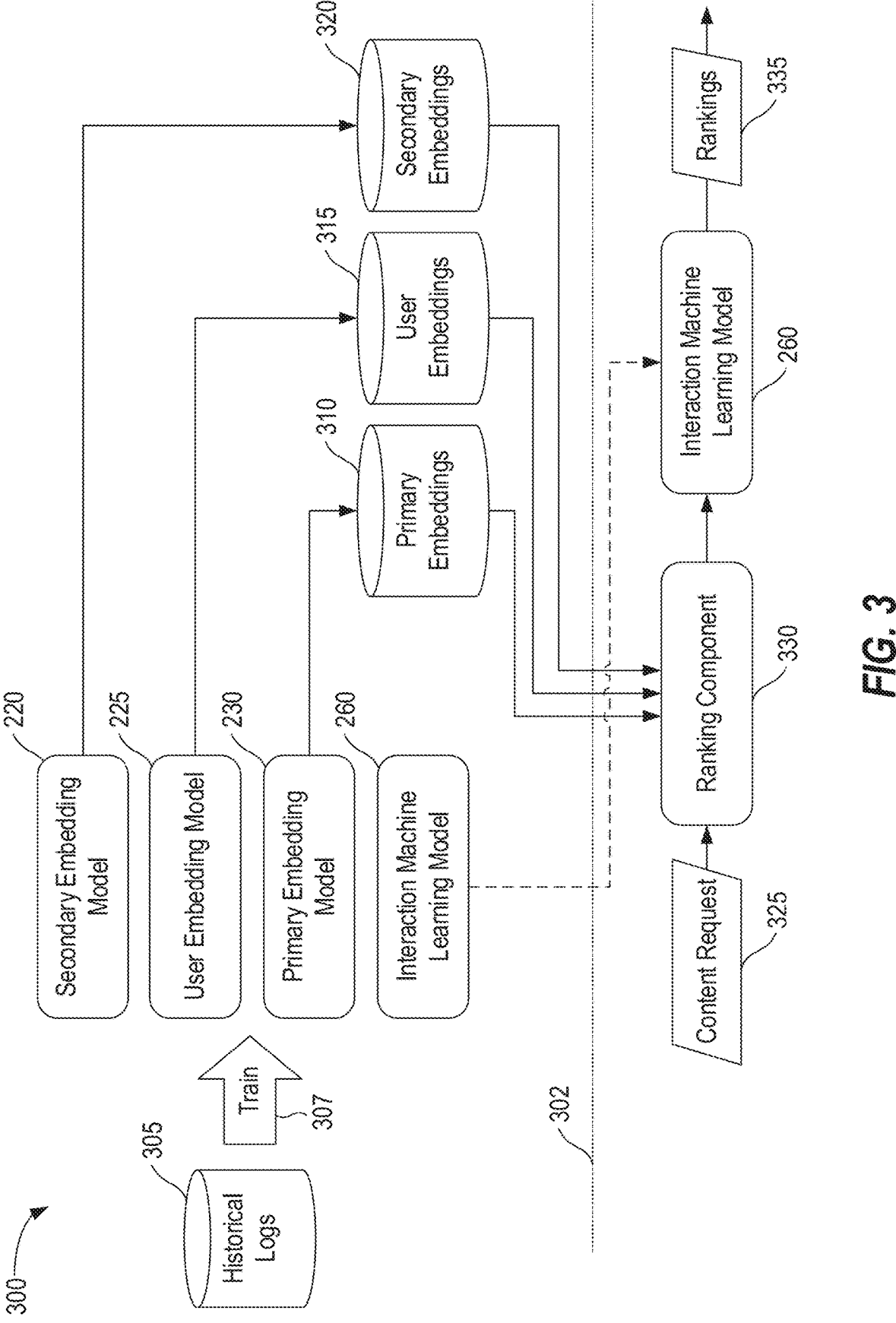
FIG. 3 depicts an example serving architecture for multimodal machine learning, according to some embodiments of the present disclosure.

FIG. 3 depicts an example serving architecture 300 for multimodal machine learning, according to some embodiments of the present disclosure. In some embodiments, the architecture 300 provides additional detail for the machine learning model(s) used by an AI component, such as the AI component 115 of FIG. 1, to evaluate supplemental content items. That is, the architecture 300 may be used by a machine learning system, such as the machine learning system 105 of FIG. 1.

The illustrated architecture 300 depicts operations of an offline phase (corresponding to components above the dotted line 302) and an online phase (corresponding to components below the dotted line 302). That is, the depicted operations and components above the dotted line 302 may be performed offline (e.g., at any time without any real-time requirements or expectations), while the depicted operations and components below the dotted line 302 may be performed online (e.g., in real-time, such as responsive to content requests, where the system is expected to return a result relatively quickly).

As illustrated, during the offline phase, a set of historical logs 305 are used to train a set of machine learning models (e.g., the secondary embedding model 220, the user embedding model 225, the primary embedding model 230, and the interaction machine learning model 260, as discussed above), as indicated by the arrow 307. Generally, the historical logs 305 can indicate how one or more user(s) reacted to or interacted with one or more supplemental content items at a prior time. For example, each log in the set of historical logs 305 may indicate relevant information such as the demographics, preferences, hobbies, or any other relevant characteristic of the corresponding user (e.g., user data such as the user data 130 of FIG. 1 and/or the user data 210 of FIG. 2), the media content that the user was consuming (e.g., the primary content item 215 of FIG. 2, such as from a library of primary content 120 of FIG. 1), and the supplemental item that was delivered to the user (e.g., the supplemental content item 205 of FIG. 2, selected from a library of supplemental content 125 of FIG. 1). In some embodiments, each log may further include a label indicating the actual action that the user performed (e.g., closing the content, requesting more information via push notification, and the like).

In some embodiments, the historical logs 305 may include the content items themselves (e.g., snippets of video). In some aspects, the historical logs 305 may include pointers to the content items (e.g., stored in one or more repositories) and/or metadata, embeddings, and/or features generated and/or extracted from the content.

In some embodiments, as discussed above, the secondary embedding model 220, the user embedding model 225, the primary embedding model 230, and the interaction machine learning model 260 may be jointly trained (e.g., end-to-end) during the offline phase. As illustrated, once training is complete (e.g., once one or more training termination criteria are met, as discussed in more detail below), the machine learning system may use the secondary embedding model 220, the user embedding model 225, and the primary embedding model 230 to generate a set of embeddings during the offline phase. Specifically, the secondary embedding model 220 may be used to generate a corpus or library of secondary embeddings 320, the user embedding model 225 may be used to generate a corpus or library of user embeddings 315, and the primary embedding model 230 may be used to generate a corpus or library of primary embeddings 310.

For example, in some embodiments, the machine learning system may generate one or more primary embeddings 310 for each primary content item that the content server offers to users (e.g., each item in the library of primary content 120 of FIG. 1). That is, the machine learning system may process each primary content item (or features therefrom, such as metadata features) using the primary embedding model 230 (which may include multiple models, such as one to generate image features one to generate audio features, and the like) in order to generate one or more primary embeddings (e.g., one embedding for each window or snippet, such as each thirty second or one minute long window) for the item. These embeddings may then be stored in the repository of primary embeddings 310. Advantageously, this primary embedding generation process may be performed offline, allowing the machine learning system to represent the entire library of primary content items (which may be quite large) in an efficient and compact manner (using numerical embeddings). Further, when new primary content items become available (e.g., when new shows or movies are added to the library of primary content), the machine learning system can readily generate new primary embeddings for this new content, storing the embeddings in the repository of primary embeddings 310 for future use. Further, when any primary content is removed from the offerings (e.g., no longer served to users), the machine learning system need only delete, remove, or otherwise mark as inactive the corresponding embeddings.

Further, in some embodiments, the machine learning system may generate one or more secondary embeddings 320 for each supplemental content item that the content server offers to users (e.g., each item in the library of supplemental content 125 of FIG. 1). That is, the machine learning system may process each supplemental content item (or features therefrom, such as features indicated in associated metadata) using the secondary embedding model 220 in order to generate one or more secondary embeddings for the item. These embeddings may then be stored in the repository of secondary embeddings 320. Advantageously, this secondary embedding generation process may be performed offline, allowing the machine learning system to represent the entire library of supplemental content items (which may be quite large) in an efficient and compact manner (using numerical embeddings). Further, when new supplemental content items become available (e.g., when new advertisement campaigns or interactive offerings are added to the library of supplemental content), the machine learning system can readily generate new secondary embeddings for this new content, storing the embeddings in the repository of secondary embeddings 320 for future use. Further, when any supplemental content is removed from the offerings (e.g., no longer served to users), the machine learning system need only delete, remove, or otherwise mark as inactive the corresponding embeddings.

Additionally, in some embodiments, the machine learning system may generate one or more user embeddings 315 for each user that the content server serves (e.g., each registered account of the content server). That is, the machine learning system may process each set of user data (e.g., demographics data, historical usage data, and the like) using the user embedding model 225 in order to generate one or more user embeddings for the user. These embeddings may then be stored in the repository of user embeddings 315. Advantageously, this user embedding generation process may be performed offline, allowing the machine learning system to represent the entire audience of users (which may be quite large) in an efficient and compact manner (using numerical embeddings). Further, when new users register (e.g., or when new information for a given user, such as new interaction responses to content deliveries, become available), the machine learning system can readily generate new and/or updated user embeddings for this new information, storing the embeddings in the repository of user embeddings 315 for future use. Further, when any users are no longer consuming the items (e.g., if they cancel their service or request deletion of their data), the machine learning system need only delete, remove, or otherwise mark as inactive the corresponding embeddings.

As discussed above, by performing these training and embedding generation processes offline, the machine learning system can be significantly improved. For example, performing the operations offline means that the machine learning system need not comply with rigorous latency requirements (e.g., due to real-time constraints when a user is waiting for the output), which means that fewer computational resources need be dedicated to the operations (e.g., the machine learning system can operate with less memory capacity, reduced processing power, lower energy consumption, less heat generation, and the like).

As depicted in the illustrated serving architecture 300, the interaction machine learning model 260 can be deployed to an online runtime environment after training. During this online phase, content requests 325 may be received. Generally, the content request 325 corresponds to any request for supplemental content items. For example, the content request 325 may be generated when a user requests a primary content item (e.g., where the content request 325 is a request for a supplemental content item to be provided to the user prior to serving the primary content), and/or while the user is consuming primary content (e.g., in advance of an upcoming insertion slot or opportunity where supplemental content can be provided during a break or interruption in the primary content, or alongside the primary content).

As illustrated, the content request 325 is accessed by a ranking component 330. As used herein, "accessing" data may generally include receiving, requesting, retrieving, generating, obtaining, or otherwise gaining access to the data. For example, the ranking component 330 may receive the content request 325 from another entity or application, such as the content server 135 or the content application 145, each of FIG. 1. In some aspects, the content request 325 may indicate relevant information about the request, such as identifying the primary content item(s) being consumed or requested, the user (or users) that are consuming or requesting the primary content, and the like.

As illustrated, the ranking component 330 may access relevant embeddings (from the repositories generated offline) based on the content request 325. For example, based on the indicated primary content item being consumed, the ranking component 330 may fetch, from the primary embeddings 310, the media embedding(s) corresponding to the content (or the embeddings corresponding to the particular timestamp in the content, where the timestamps indicate when the supplemental content will be provided, relative to the primary content). Similarly, based on the user(s) indicated by the content request 325, the ranking component 330 can fetch the corresponding user embedding(s) from the repository of user embeddings 315.

In some embodiments, the ranking component 330 can further retrieve a set of secondary embeddings for one or more candidate supplemental items to serve the content request 325. In some embodiments, the set of candidate items corresponds to all supplemental content items in the library of content. In some embodiments, the ranking component 330 may identify a subset of items, from the library of supplemental content, that are candidates to be provided to the particular user(s). That is, various constraints may be defined to control what supplemental content item(s) should be provided to users, such as based on the target demographics of a given item of supplemental content. For example, based on the user demographics, the ranking component 330 may filter the library of secondary embeddings to find candidate items of supplemental content that align with the user's demographics (or any other constraints).

As illustrated, the ranking component 330 can then provide the retrieved embeddings (e.g., the primary embedding(s) for the primary content being delivered, the user embedding(s) for the user(s) consuming the primary content, and the secondary embedding(s) for the candidate supplemental content item(s)) to the deployed interaction machine learning model 260. As discussed above, the interaction machine learning model 260 can then generate a set of one or more interaction scores (e.g., the interaction scores 265 of FIG. 2) for each candidate supplemental content item. For example, the interaction machine learning model 260 may process each respective secondary embedding (corresponding to a supplemental content item from the set of candidate supplemental content items) along with the user and primary embeddings to generate score(s) for the respective embedding. This can be repeated (sequentially or in parallel) for each supplemental content item to generate the set of scores.

In the illustrated example, these interaction scores are used to define a set of rankings 335. Generally, the rankings 335 may comprise an ordering of the candidate supplemental content items, arranged based on the benefit that is expected to be achieved should each be selected. For example, the interaction machine learning model 260 may sort the items by their interaction scores such that the highest scored item (e.g., the item that is predicted to result in the most positive interaction) is first. In some embodiments, the machine learning system may select this highest-scored item. In other embodiments, the machine learning system may use other factors to select from among the highest scored items (e.g., potentially selecting a lower scored item based on other factors, such as contractual agreements).

In this way, the machine learning system can generate interaction scores during the online phase rapidly and efficiently, while performing more computationally expensive training and embedding generation offline. This substantially improves the performance of the system.

In some embodiments, in addition to or instead of deploying the interaction machine learning model 260 online directly, the interaction machine learning model 260 (trained offline) can be used to generate a smaller and/or more efficient model (e.g., a distilled version of the interaction machine learning model 260). This more efficient version can then be deployed for online use. For example, in some embodiments, techniques such as knowledge distillation may be used to generate a child or distilled version of the interaction machine learning model 260, and this more efficient version can then be deployed to process the embeddings (provided by the ranking component 330) during runtime.

Figure 4:
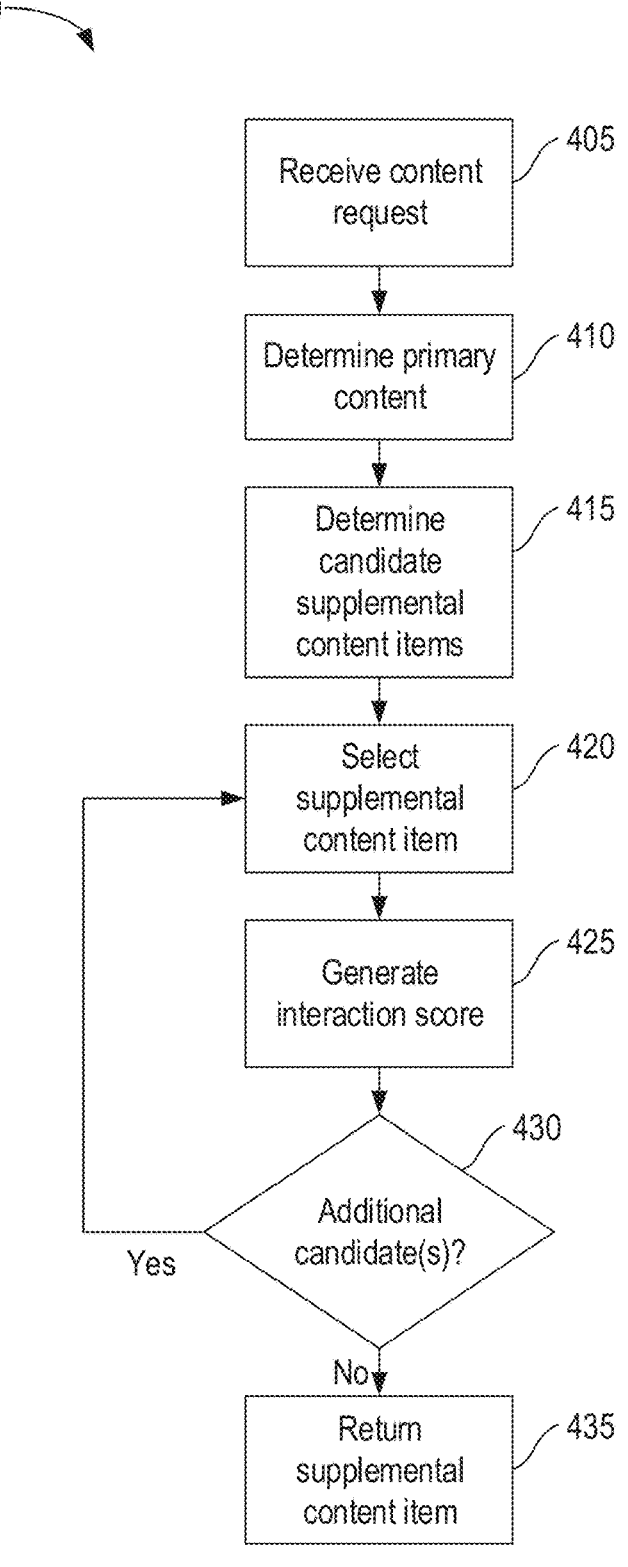
FIG. 4 is a flow diagram depicting an example method for multimodal machine learning, according to some embodiments of the present disclosure.

FIG. 4 is a flow diagram depicting an example method 400 for multimodal machine learning, according to some embodiments of the present disclosure. In some embodiments, the method 400 is performed by a machine learning system, such as the machine learning system 105 of FIG. 1. In some embodiments, the method 400 may be performed in an online fashion (e.g., in real-time in response to user requests).

At block 405, the machine learning system receives a content request (e.g., the content request 325 of FIG. 3). As discussed above, the content request may generally correspond to or comprise any explicit or implicit request or indication for supplemental content. For example, the content request may comprise a request for primary content (e.g., a request to stream a movie), and the machine learning system may recognize or determine that supplemental content should also be identified to be provided at least partially in response to the primary request (e.g., prior to beginning the primary content, while providing the primary content, and the like). In some aspects, the content request may be received from a programmatic element (e.g., a streaming application may itself request supplemental content in the course of providing streaming primary content).

At block 410, the machine learning system determines the primary content item(s) associated with the content request. For example, as discussed above, a user may request an item of primary content (e.g., to be streamed to their device). By identifying this primary content, the machine learning system can better evaluate alternative supplemental content items to respond to the request.

At block 415, the machine learning system determines a set of candidate supplemental content items that may be used to respond to the content request. For example, in some embodiments, the machine learning system can evaluate a library of supplemental content items to select a subset of the library that can or should be provided in response to the content request based on a set of constraints, such as preferences or limitations regarding target demographics of each supplemental content item, any relevant contractual requirements or restraints (e.g., to avoid providing the supplemental content item to users having particular interests or other characteristics), and the like. For example, a given item of supplemental content may indicate that it is approved or targeted for users with certain characteristics, such as users with one or more designated interests, users in a designated geographic area, intended for output during designated times of day and/or days of the week, and the like. In some aspects, the machine learning system can filter the broader library of content items or a relatively smaller subset of candidate items at block 415, allowing the subsequent machine learning-based evaluation to be accelerated.

At block 420, the machine learning system selects one of the candidate supplemental content items for evaluation. Generally, the machine learning system may use any suitable technique to select the item at block 420, including randomly or pseudo-randomly, as each candidate item may be evaluated during the method 400.

At block 425, the machine learning system generates an interaction score for the selected supplemental content item using one or more machine learning models, as discussed above. For example, as discussed above, the machine learning system may generate or retrieve a primary content embedding for the identified primary content (e.g., from the library of primary embeddings 310 of FIG. 3), a supplemental content embedding for the selected candidate supplemental content (e.g., from the library of secondary embeddings 320 of FIG. 3), and a user embedding corresponding to the user associated with the content request (e.g., from the user embeddings 315 of FIG. 3). By evaluating these embeddings using a machine learning model (e.g., the interaction machine learning model 260 of FIG. 3), the machine learning system can efficiently score the candidate supplemental content item. Further, by using embeddings that can be generated offline (e.g., prior to receiving the content request at block 405), the machine learning system can generate the scores with substantially reduced latency and computational expense during runtime.

At block 430, the machine learning system determines whether there is at least one additional candidate supplemental content item that has not yet been evaluated. If so, the method 400 returns to block 420. If not, the method 400 continues to block 435. Although the illustrated example depicts an iterative process (e.g., selecting and evaluating each candidate item in sequence) for conceptual clarity, in some aspects, the machine learning system may evaluate some or all of the supplemental content items entirely or partially in parallel. Further, although the illustrated example depicts evaluating all of the candidate supplemental content items, in some embodiments, the machine learning system may use one or more early-exit criteria from the evaluation process, such as if a designated or defined time limit is reached (e.g., a point at which the machine learning system should return the highest scored item immediately because time has expired), if a designated minimum score has been found (e.g., terminating the loop as soon as a candidate item having a sufficiently high score is found), and the like.

At block 435, the machine learning system returns a supplemental content item from the set of candidate items. For example, as discussed above, the machine learning system may rank or sort the candidate items based on their associated interaction scores, and may return the highest-scored item in the list. In this way, the machine learning system can maximize (or at least increase) the probability that the supplemental content item will be a good fit (e.g., that it will merge well with the primary content, that it will be relevant and interesting to the user, that the user will interact with the supplemental content, and the like).

Although not depicted in the illustrated example, the selected supplemental content item(s) can then be delivered or provided to the user, along with the primary content associated with the content request. For example, the selected supplemental content may be displayed or output (e.g., via one or more displays, speakers, and the like) of a user device prior to outputting the primary content, during breaks or pauses of the primary content, after outputting the primary content, and the like. In some embodiments, the supplemental content may be output in designated portion(s) of the display(s) used to deliver the primary content (e.g., at the bottom or side of the display), and/or via one or more other user devices (e.g., displaying the supplemental content via a secondary display or device associated with the user).

Figure 5:
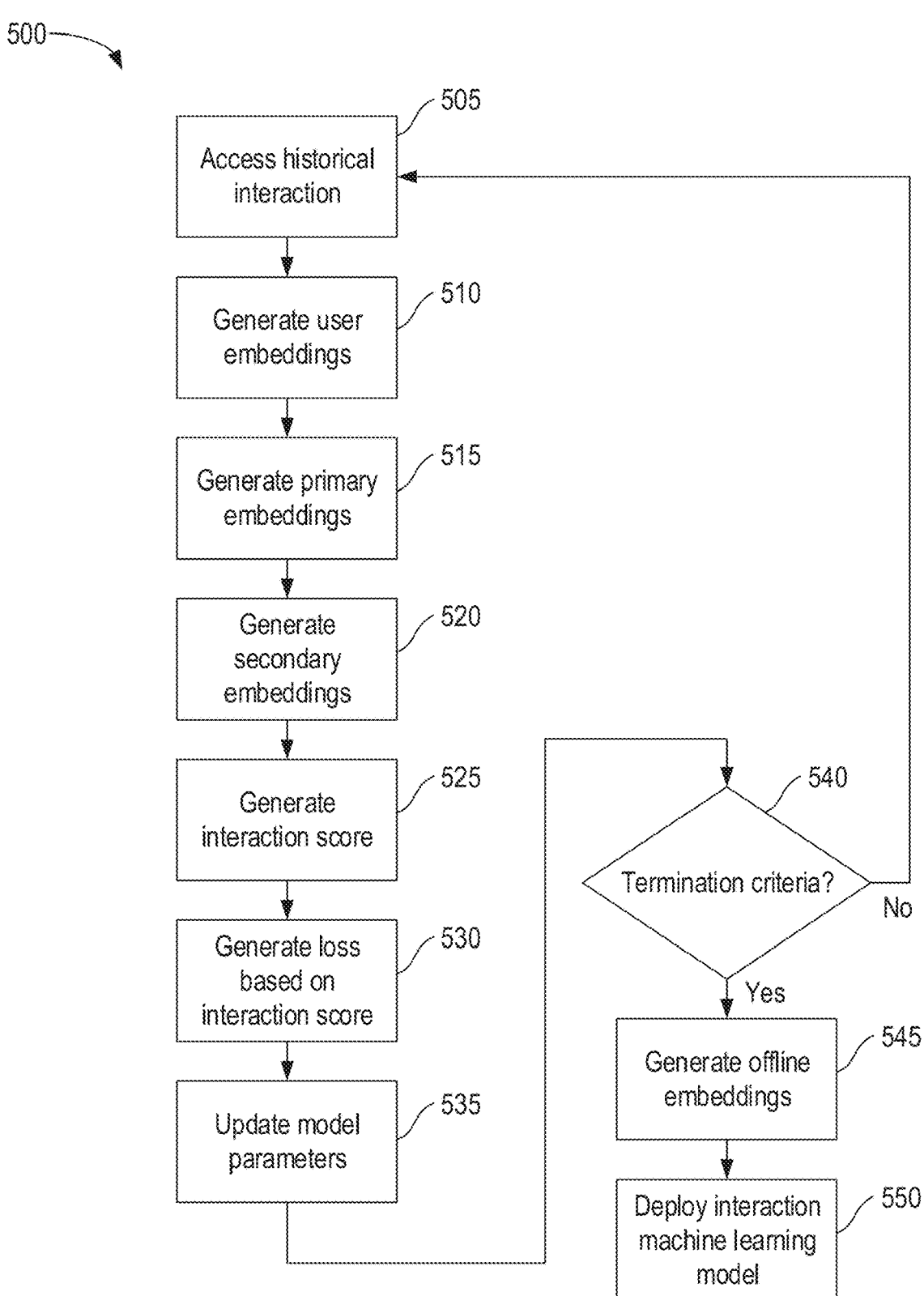
FIG. 5 is a flow diagram depicting an example method for training multimodal machine learning models, according to some embodiments of the present disclosure.

FIG. 5 is a flow diagram depicting an example method 500 for training multimodal machine learning models, according to some embodiments of the present disclosure. In some embodiments, the method 500 is performed by a machine learning system, such as the machine learning system 105 of FIG. 1. In some embodiments, the method 500 may be performed in an offline fashion (e.g., not in real-time and/or not in response to any user request, such as before any content request is received).

At block 505, the machine learning system accesses historical interaction information (e.g., in the historical logs 305 of FIG. 3) to be used to train the machine learning model components to generate interaction scores. For example, the historical interaction information may indicate or correspond to previous instances of providing supplemental content, including identifying the supplemental content item that was provided, indicating the primary content that the supplemental content was provided in conjunction with, identifying the user that received the primary and supplemental content, indicating how the user responded to the supplemental content (if at all), and the like. In some aspects, at block 505, the machine learning system accesses or selects a single instance of such a historical interaction (e.g., a single log).

At block 510, the machine learning system generates one or more user embeddings (e.g., the user embeddings 240 of FIG. 2) based on the historical interaction log(s). For example, as discussed above, the machine learning system may use an embedding machine learning model (e.g., the user embedding model 225 of FIGS. 2-3) to process one or more features or characteristics from the user data (e.g., the demographics of the user) to generate the user embedding.

At block 515, the machine learning system generates one or more primary content embeddings (e.g., the primary embeddings 245 of FIG. 2) based on the historical interaction log(s). For example, as discussed above, the machine learning system may use an embedding machine learning model (e.g., the primary embedding model 230 of FIGS. 2-3) to process one or more features or characteristics of the primary content indicated in the log (e.g., based on metadata associated with the content, such as the genre, theme, and the like) to generate the primary content embedding.

At block 520, the machine learning system generates one or more supplemental content embeddings (e.g., the secondary embeddings 235 of FIG. 2) based on the historical interaction log(s). For example, as discussed above, the machine learning system may use an embedding machine learning model (e.g., the secondary embedding model 220 of FIGS. 2-3) to process one or more features or characteristics of the supplemental content indicated in the log (e.g., based on metadata associated with the content, such as the related products, target demographics, and the like) to generate the supplemental content embedding.

At block 525, the machine learning system generates an interaction score for the historical interaction log based on processing the user embedding, the primary content embedding, and the supplemental content embedding using a machine learning model (e.g., the interaction machine learning model 260 of FIGS. 2-3). In some aspects, as discussed above, the machine learning system may additionally process other information, such as user-supplemental content interactions (e.g., the interaction features 250 of FIG. 2) and/or user-primary content interactions (e.g., the interaction features 255 of FIG. 2) using the interaction model.

As discussed above, the interaction mode is generally configured to generate one or more scores indicating the probability that the user will interact or perform one or more specific actions with respect to the supplemental content item. For example, in some aspects, the machine learning system predicts the probability that the user will perform actions such as clicking on the content, requesting a push notification, email, or other message regarding the content, scan the content (or a barcode or QR code therein), view the content to completion, ignore the content or close it, and the like.

At block 530, the machine learning system generates a loss based on the interaction score and an actual or ground truth interaction indicated in the historical interaction log. For example, as discussed above, the machine learning system may compute a loss based on the difference between the predicted interactions and the actual action(s) of the user. The machine learning system can generally use a variety of loss formulations, such as cross-entropy loss, to compute the loss.

At block 535, the machine learning system updates one or more parameters of the machine learning model(s) based on the loss. For example, as discussed above, the machine learning system may use backpropagation to jointly train each model end-to-end (e.g., refining the parameters of the interaction model, as well as each embedding model, using the loss).

At block 540, the machine learning system determines whether one or more training termination criteria are met. If not, the method 500 returns to block 505 to access a new log. Generally, the machine learning system may evaluate a variety of criteria to determine whether to terminate training. For example, the machine learning system may determine whether any additional historical logs are available for training, whether a defined number of training iterations or epochs have been performed, whether a defined amount of computational resources have been spent training, whether the model(s) have reached a desired accuracy threshold, and the like.

If, at block 540, the machine learning system determines that the termination criteria are met, the method 500 continues to block 545, where the machine learning system generates a set of offline embeddings using at least a subset of the trained models. For example, as discussed above, the machine learning system may use the secondary embedding model (e.g., the secondary embedding model 220 of FIG. 3) to pre-generate embeddings for a library of supplemental content items (e.g., the secondary embeddings 320 of FIG. 3), allowing these embeddings to be rapidly accessible during runtime.

Similarly, as discussed above, the machine learning system may use the primary content embedding model (e.g., the primary embedding model 230 of FIG. 3) to pre-generate embeddings for a library of primary content items (e.g., the primary embeddings 310 of FIG. 3), allowing these embeddings to be rapidly accessible during runtime. Further, as another example, the machine learning system may use the user embedding model (e.g., the user embedding model 225 of FIG. 3) to pre-generate embeddings for a set of users associated with the media server or platform (e.g., the user embeddings 315 of FIG. 3), allowing these embeddings to be rapidly accessible during runtime.

At block 550, the machine learning system can then deploy the interaction machine learning model for runtime use. That is, while the embedding model(s) may be trained and used offline to generate libraries of useful embeddings, the interaction model may be trained offline and deployed to an online environment for real-time use (e.g., to respond to content requests in real-time or near real-time, as discussed above).

FIG. 6 is a flow diagram depicting an example method 600 for feature generation for multimodal machine learning, according to some embodiments of the present disclosure. In some embodiments, the method 600 is performed by a machine learning system, such as the machine learning system 105 of FIG. 1. In some embodiments, the method 600 may be performed in an offline fashion (e.g., not in real-time and/or not in response to any user request, such as before any content request is received). In some aspects, the method 600 provides additional detail for the embedding generation process discussed above with reference to blocks 510, 515, and 520 of FIG. 5.

At block 605, the machine learning system accesses a set of user features used to generate user embeddings. For example, as discussed above, the machine learning system may determine features or characteristics of the user such as their demographics (e.g., age, location, residency, and the like), preferences or interests, hobbies, and the like.

At block 610, the machine learning system generates a user embedding (e.g., the user embedding 240 of FIG. 2) based on processing the user features (accessed at block 605) using a user embedding machine learning model (e.g., the user embedding model 225 of FIG. 2).

At block 615, the machine learning system accesses a set of supplemental content item features for a given item of supplemental content. In some embodiments, as discussed above, the machine learning system may determine features or characteristics of the supplemental content, such as from metadata associated with the supplemental content item. For example, as discussed above, the supplemental content items may each have metadata indicating features or characteristics of the item, such as the industry or product the item relates to, the mood or atmosphere of the supplemental content item, the length of the supplemental content item, the visual brightness and/or audio volume of the supplemental content item, and the like.

At block 620, the machine learning system generates a secondary embedding (e.g., the secondary embedding 235 of FIG. 2) based on processing the supplemental content features (accessed at block 615) using a secondary embedding machine learning model (e.g., the secondary embedding model 220 of FIG. 2).

At block 625, the machine learning system accesses a set of primary content item features for a given item of primary content. In some embodiments, as discussed above, the machine learning system may determine features or characteristics of the primary content, such as from metadata associated with the primary content item. In some embodiments, the machine learning system may additionally or alternatively extract features from the primary content, such as image(s) (e.g., one or more frames) from the content, audio (e.g., spoken words and/or sound effects included in the content), and the like. In some aspects, as discussed above, the machine learning system may access a subset of such features (e.g., a relatively small set of frames and/or audio, such as from the last thirty seconds of content or the last minute of content prior to the point when the supplemental content is to be inserted or provided).

At block 630, the machine learning system generates one or more image embeddings based on processing the at least a subset of the primary features (e.g., the image(s) or frame(s) accessed at block 625) using a first media embedding machine learning model. For example, the first media embedding model may comprise a convolutional neural network trained to generate embeddings based on input image data.

At block 635, the machine learning system generates one or more audio embeddings based on processing the at least a subset of the primary features (e.g., the audio accessed at block 625) using a second media embedding machine learning model. For example, the second media embedding model may generate embeddings based on audio input.

At block 640, the machine learning system then aggregates the media embeddings (e.g., the image embedding(s) generated at block 630 and/or the audio embedding(s) generated at block 635) to form a primary content embedding for the primary content item. For example, as discussed above, the machine learning system may concatenate the embeddings, sum the embeddings, or process the embeddings using a secondary machine learning model trained to generate an aggregated media embedding based on the individual modalities.

In this way, the machine learning system can pre-generate embeddings for subsequent runtime use, substantially reducing the computational expense, latency, power consumption, and heat generation of the online operations.

FIG. 7 is a flow diagram depicting an example method 700 for machine learning, according to some embodiments of the present disclosure. In some embodiments, the method 700 is performed by a machine learning system, such as the machine learning system 105 of FIG. 1.

At block 705, a request for supplemental content (e.g., the content request 325 of FIG. 3) to be provided in association with a media content item (e.g., a primary content item such as the content 140 of FIG. 1) is received.

At block 710, a set of candidate supplemental content items (e.g., the supplemental content item 205 of FIG. 2) for the request is determined.

At block 715, a user embedding (e.g., the user embedding 240 of FIG. 2) corresponding to a user associated with the media content item, a media embedding (e.g., the primary embedding 245 of FIG. 2) corresponding to the media content item, and a set of supplemental content embeddings (e.g., the secondary embeddings 235 of FIG. 2) corresponding to the set of candidate supplemental content items are accessed from one or more storage repositories (e.g., the library of primary embeddings 310, user embeddings 315, and secondary embeddings 320, each of FIG. 3).

At block 720, a set of interaction scores (e.g., the interaction score 265 of FIG. 2 and/or the rankings 335 of FIG. 3) is generated based on processing the user embedding, the media embedding, and the set of supplemental content embeddings using an interaction machine learning model.

At block 725, a first supplemental content item of the set of candidate supplemental content items is selected for the request based on the set of interaction scores.

Figure 8:
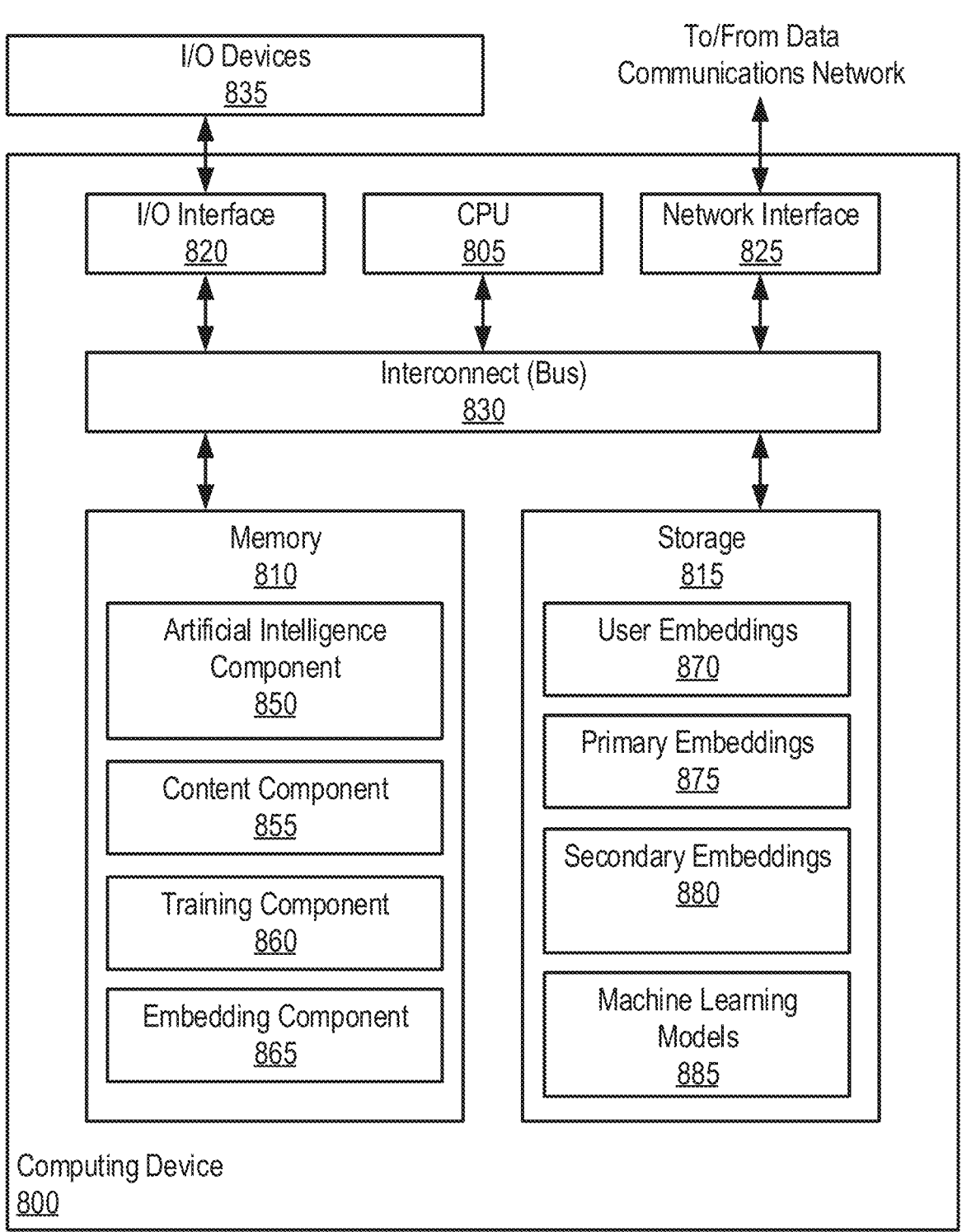
FIG. 8 depicts an example computing device configured to perform various embodiments of the present disclosure.

FIG. 8 depicts an example computing device 800 configured to perform various aspects of the present disclosure. Although depicted as a physical device, in embodiments, the computing device 800 may be implemented using virtual device(s), and/or across a number of devices (e.g., in a cloud environment). In one embodiment, the computing device 800 corresponds to or implements a machine learning system, such as the machine learning system 105 of FIG. 1.

As illustrated, the computing device 800 includes a CPU 805, memory 810, a network interface 825, and one or more I/O interfaces 820. Though not included in the depicted example, in some embodiments, the computing device 800 also includes one or more storages. In the illustrated embodiment, the CPU 805 retrieves and executes programming instructions stored in memory 810, as well as stores and retrieves application data residing in memory 810 and/or storage (not depicted). The CPU 805 is generally representative of a single CPU and/or GPU, multiple CPUs and/or GPUs, a single CPU and/or GPU having multiple processing cores, and the like. The memory 810 is generally included to be representative of a random access memory. In an embodiment, if storage is present, it may include any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 835 (such as keyboards, monitors, etc.) are connected via the I/O interface(s) 820. Further, via the network interface 825, the computing device 800 can be communicatively coupled with one or more other devices and components (e.g., via a network, which may include the Internet, local network(s), and the like). As illustrated, the CPU 805, memory 810, network interface(s) 825, and I/O interface(s) 820 are communicatively coupled by one or more buses 830.

In the illustrated embodiment, the memory 810 includes an AI component 850, a content component 855, a training component 860, and an embedding component 865, which may perform one or more embodiments discussed above. Although depicted as discrete components for conceptual clarity, in embodiments, the operations of the depicted components (and others not illustrated) may be combined or distributed across any number of components. Further, although depicted as software residing in memory 810, in embodiments, the operations of the depicted components (and others not illustrated) may be implemented using hardware, software, or a combination of hardware and software.

The AI component 850 (which may correspond to the AI component 115 of FIG. 1 and/or the ranking component 330 of FIG. 3) may generally be used to evaluate and score supplemental content items using machine learning, as discussed above. For example, the AI component 850 may access embeddings for various modalities of input (e.g., user embeddings, secondary embeddings, and primary embeddings) and process these inputs using trained models (e.g., the interaction machine learning model 260 of FIGS. 2 and 3) to score and rank the various supplemental content items.

The content component 855 (which may correspond to the content server 135 of FIG. 1) may generally be used to facilitate the provisioning of content (including primary content and supplemental content) to users, as discussed above. For example, the content component 855 may receive and process primary content requests to provide such primary content to users, as well as interfacing with other components (e.g., the AI component 850) to select and provide relevant supplemental content items for consumption by the user.

The training component 860 (which may perform the training operations discussed above with reference to the arrow 307 of FIG. 3) may generally be used to train the machine learning models used for content evaluation, as discussed above. For example, the training component 860 may jointly train the machine learning models 885, which may include, for example, a secondary embedding model 220, a user embedding model 225, a primary embedding model 230, and/or an interaction machine learning model 260, each of FIGS. 2-3.

The embedding component 865 may generally be used to generate embeddings using trained models (e.g., offline), as discussed above. For example, the embedding component 865 may, prior to any requests for supplemental content, use trained models (e.g., the machine learning models 885) to generate user embeddings, primary content embeddings, supplemental content embeddings, and the like.

In the illustrated example, the storage 815 includes user embeddings 870, primary embeddings 875, secondary embeddings 880, and one or more machine learning models 885. Although depicted as residing in storage 815, the depicted data may be stored in any suitable location.

Generally, the user embeddings 870 (which may correspond to the user embeddings 315 of FIG. 3) may comprise embeddings for individual users of the content streaming system, as discussed above. The primary embeddings 875 (which may correspond to the primary embeddings 310 of FIG. 3) may comprise embeddings for individual items of primary content (e.g., from a library of primary content such as the primary content 120 of FIG. 1), as discussed above. The secondary embeddings 880 (which may correspond to the secondary embeddings 320 of FIG. 3) may comprise embeddings for individual items of supplemental content (e.g., from a library of supplemental content such as the supplemental content 125 of FIG. 1), as discussed above.

The machine learning models 885 may generally include the models discussed above, such as a supplemental model (e.g., the secondary embedding model 220 of FIGS. 2-3), a primary model (e.g., the primary embedding model 230 of FIGS. 2-3), a user model (e.g., the user embedding model 225 of FIGS. 2-3), and/or an interaction model (e.g., the interaction machine learning model 260 of FIGS. 2-3).

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:

receiving a request for supplemental content to be provided in association with a media content item;

determining a set of candidate supplemental content items for the request;

accessing, from one or more storage repositories, a user embedding corresponding to a user associated with the media content item, a media embedding corresponding to the media content item, and a set of supplemental content embeddings corresponding to the set of candidate supplemental content items;

generating a set of interaction scores based on processing the user embedding, the media embedding, and the set of supplemental content embeddings using an interaction machine learning model, wherein:

a set of embedding machine learning models and the interaction machine learning model were jointly trained during an offline phase, the user embedding, the media embedding, and the set of supplemental content embeddings were generated using the set of embedding machine learning models during the offline phase, the set of interaction scores are generated using the interaction machine learning model during an online phase, and the set of embedding machine learning models do not process data during the online phase; and selecting, for the request, a first supplemental content item of the set of candidate supplemental content items based on the set of interaction scores.

2. The method of claim 1, wherein determining the set of candidate supplemental content items comprises identifying a subset of supplemental content items from a library of supplemental content items based on a set of constraints corresponding to the user.

3. The method of claim 1, wherein the user embedding was generated offline based on processing one or more features of the user using a user embedding machine learning model, wherein the one or more features comprise one or more demographics of the user.

4. The method of claim 1, wherein the media embedding was generated offline based on:

generating a set of image features based on processing image data from the media content item using a first media embedding machine learning model;

generating a set of audio features based on processing audio data from the media content item using a second media embedding machine learning model; and aggregating the set of image features and the set of audio features.

5. The method of claim 4, wherein the media embedding was further generated offline based on processing the aggregated set of image features and set of audio features using a third media embedding machine learning model.

6. The method of claim 1, wherein a first supplemental content embedding of the set of supplemental content embeddings was generated offline based on processing one or more features of the first supplemental content item using a supplemental content embedding machine learning model, wherein the one or more features comprise characteristics of the first supplemental content item.

7. The method of claim 1, wherein generating the set of interaction scores comprises, for each respective candidate supplemental content item of the set of candidate supplemental content items:

generating a respective aggregated input based on concatenating the user embedding, the media embedding, and a respective supplemental content embedding, of the set of supplemental content embeddings, corresponding to the respective candidate supplemental content item; and processing the respective aggregated input using the interaction machine learning model to generate a respective interaction score for the respective candidate supplemental content item.

8. The method of claim 7, wherein generating the set of interaction scores further comprises, for each respective candidate supplemental content item of the set of candidate supplemental content items:

determining a respective set of interaction features, wherein the respective set of interaction features corresponds to at least one of: (i) interactions between the user and the media content item, (ii) interactions between the user and the respective candidate supplemental content item, or (iii) interactions between the media content item and the respective supplemental content item; and generating the respective aggregated input based further on the set of interaction features.

9. The method of claim 1, wherein the set of interaction scores correspond to an aggregation of one or more weighted probabilities of one or more positive interactions and one or more weighted probabilities of one or more negative interactions with respect to first user, the media content item, and the set of candidate supplemental content items.

10. One or more non-transitory computer readable media containing, in any combination, computer program code that, when executed by operation of any combination of one or more processors, performs an operation comprising:

receiving a request for supplemental content to be provided in association with a media content item;

determining a set of candidate supplemental content items for the request;

accessing, from one or more storage repositories, a user embedding corresponding to a user associated with the media content item, a media embedding corresponding to the media content item, and a set of supplemental content embeddings corresponding to the set of candidate supplemental content items;

generating a set of interaction scores based on processing the user embedding, the media embedding, and the set of supplemental content embeddings using an interaction machine learning model, wherein:

a set of embedding machine learning models and the interaction machine learning model were jointly trained during an offline phase, the user embedding, the media embedding, and the set of supplemental content embeddings were generated using the set of embedding machine learning models during the offline phase, the set of interaction scores are generated using the interaction machine learning model during an online phase, and the set of embedding machine learning models do not process data during the online phase; and selecting, for the request, a first supplemental content item of the set of candidate supplemental content items based on the set of interaction scores.

11. The one or more non-transitory computer readable media of claim 10, wherein the user embedding was generated offline based on processing one or more features of the user using a user embedding machine learning model, wherein the one or more features comprise one or more demographics of the user.

12. The one or more non-transitory computer readable media of claim 10, wherein the media embedding was generated offline based on:

generating a set of image features based on processing image data from the media content item using a first media embedding machine learning model;

generating a set of audio features based on processing audio data from the media content item using a second media embedding machine learning model; and aggregating the set of image features and the set of audio features.

13. The one or more non-transitory computer readable media of claim 10, wherein a first supplemental content embedding of the set of supplemental content embeddings was generated offline based on processing one or more features of the first supplemental content item using a supplemental content embedding machine learning model, wherein the one or more features comprise characteristics of the first supplemental content item.

14. The one or more non-transitory computer readable media of claim 10, wherein generating the set of interaction scores comprises, for each respective candidate supplemental content item of the set of candidate supplemental content items:

generating a respective aggregated input based on con-
catenating the user embedding, the media embedding,
and a respective supplemental content embedding, of
the set of supplemental content embeddings, corre-
sponding to the respective candidate supplemental content item; and
processing the respective aggregated input using the inter-
action machine learning model to generate a respective
interaction score for the respective candidate supple-
mental content item.

15. A system, comprising:
one or more processors; and
one or more memories storing a program, which, when
executed on any combination of the one or more
processors, performs operations, the operations comprising:
  receiving a request for supplemental content to be
    provided in association with a media content item;
  determining a set of candidate supplemental content
    items for the request;
accessing, from one or more storage repositories, a user
    embedding corresponding to a user associated with
    the media content item, a media embedding corre-
    sponding to the media content item, and a set of
    supplemental content embeddings corresponding to
the set of candidate supplemental content items;
  generating a set of interaction scores based on process-
    ing the user embedding, the media embedding, and
    the set of supplemental content embeddings using an
    interaction machine learning model, wherein:
a set of embedding machine learning models and the
      interaction machine learning model were jointly
      trained during an offline phase,
    the user embedding, the media embedding, and the
      set of supplemental content embeddings were generated using the set of embedding machine learn-
      ing models during the offline phase,
    the set of interaction scores are generated using the
      interaction machine learning model during an
      online phase, and
the set of embedding machine learning models do
      not process data during the online phase; and selecting, for the request, a first supplemental content
item of the set of candidate supplemental content
items based on the set of interaction scores.
16. The system of claim 15, wherein:
the user embedding was generated offline based on pro-
cessing one or more features of the user using a user
embedding machine learning model, wherein the one or
more features comprise one or more demographics of
the user,
the media embedding was generated offline based on:
  generating a set of image features based on processing
    image data from the media content item using a first
    media embedding machine learning model;
  generating a set of audio features based on processing
    audio data from the media content item using a
    second media embedding machine learning model;
    and
  aggregating the set of image features and the set of
    audio features, and
a first supplemental content embedding of the set of
supplemental content embeddings was generated
offline based on processing one or more features of the
first supplemental content item using a supplemental
content embedding machine learning model, wherein
the one or more features comprise characteristics of the
first supplemental content item.
17. The system of claim 15, wherein generating the set of
interaction scores comprises, for each respective candidate
supplemental content item of the set of candidate supple-
mental content items:
generating a respective aggregated input based on con-
catenating the user embedding, the media embedding,
and a respective supplemental content embedding, of
the set of supplemental content embeddings, corre-
sponding to the respective candidate supplemental con-
tent item; and
processing the respective aggregated input using the inter-
action machine learning model to generate a respective
interaction score for the respective candidate supple-
mental content item.

* * * * *